Feb. 7, 1961  E. W. TODD  2,970,654
MOUNTING MECHANISM FOR IMPLEMENTS
Filed Oct. 17, 1956  3 Sheets-Sheet 1
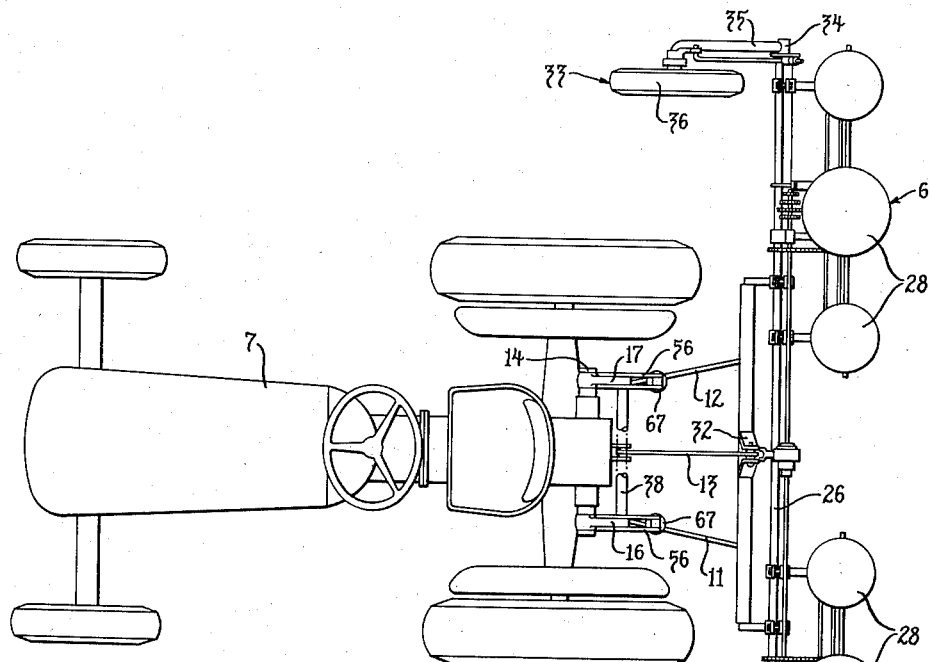
Fig. 1
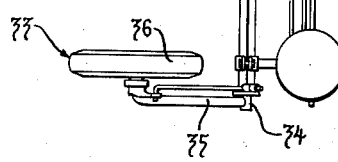
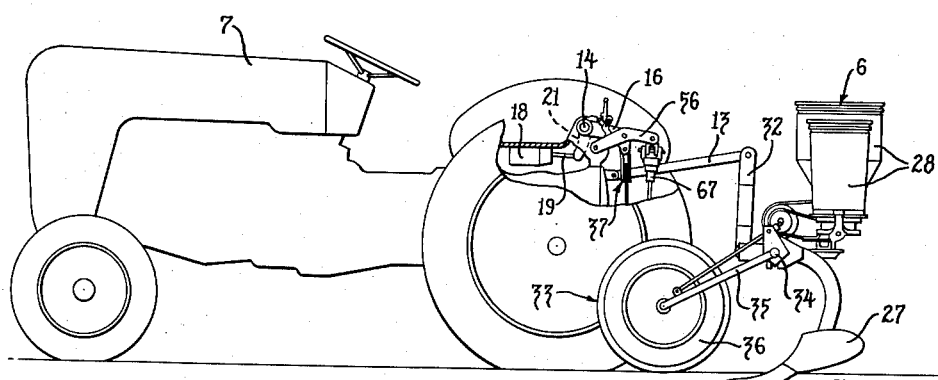
Fig. 2
INVENTOR.
EVERETT W. TODD
BY James E. Nilles
Irwin L. Groh
ATTORNEYS.

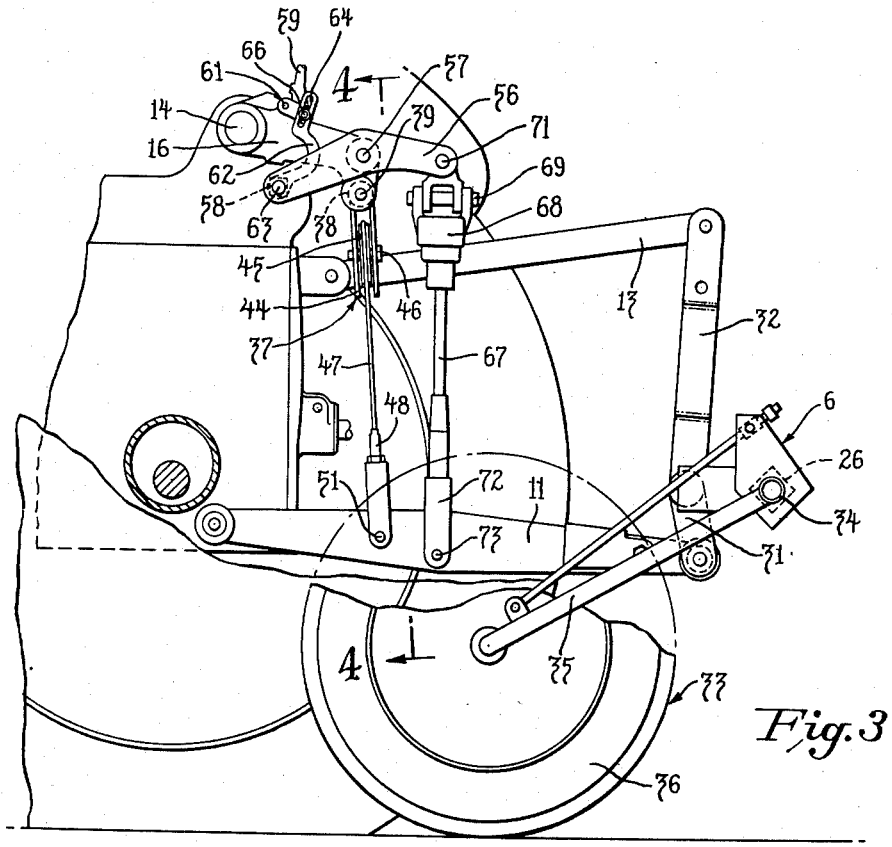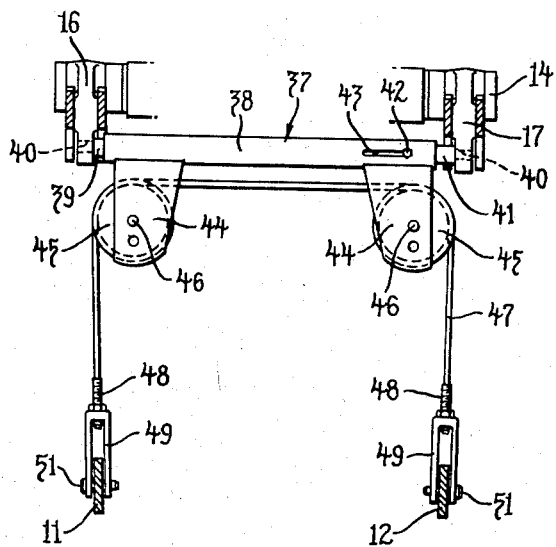

Feb. 7, 1961 E. W. TODD 2,970,654
MOUNTING MECHANISM FOR IMPLEMENTS
Filed Oct. 17, 1956 3 Sheets-Sheet 3

INVENTOR.
EVERETT W. TODD
BY James E. Nilles
Irvin L. Groh
ATTORNEYS.

United States Patent Office 2,970,654
Patented Feb. 7, 1961

2,970,654

MOUNTING MECHANISM FOR IMPLEMENTS

Everett W. Todd, Dearborn, Mich., assignor to Massey-Ferguson Inc., a corporation of Maryland Filed Oct. 17, 1956, Ser. No. 616,512

4 Claims. (Cl. 172—239)

The invention relates to agricultural implements and more particularly to a mounting mechanism for supporting an implement on a tractor in soil working and transport positions and for movement between such positions.

Certain types of tractor mounted implements are substantially wider than the tractor and should be supported on the tractor so they are free to follow the contour of the ground and remain parallel to the ground independently of the position of the tractor. To accomplish this it is necessary that the lift structure for raising and lowering the implement afford sufficient flexibility between the tractor and the implement. Ordinarily, the characteristics of an arrangement of this type are such that small vertical adjustments of the implement relative to the tractor through the lift mechanism affect only one end of the implement. For example, when the implement is tilted relative to the tractor, initial lowering movement is effective to lower the higher side of the implement first and initial raising movement is effective to raise the low side of the implement first. If the implement is to remain in a ground working position, this is undesirable since the tools at opposite sides of the implement will be working at different depths.

The above described conditions are particularly undesirable when the implement is mounted on a tractor incorporating a power operated system by which an attached implement may be moved between ground working and transport positions on a tractor and when disposed in a ground working position may be subjected to automatic draft control, that is, a type of control in which variations in draft load are sensed by the control system and the implement is automatically raised or lowered to return the draft load to some predetermined value. In such a system, corrective vertical movements of the implement may occur frequently and it is, therefore, desirable that the implement be raised and lowered in its laterally tilted position relative to the tractor to maintain a uniform working depth of the ground working tools.

It is a general object of the invention to provide a mounting mechanism for a tractor mounted implement, in which the implement may tilt relative to the tractor to remain parallel to the ground and in which the vertical ground working position of the implement relative to the tractor may be changed without affecting the tilted position of the implement so that it may remain parallel to the ground.

It is another object of the invention to provide a mounting mechanism of the above outlined type in which the implement may be maintained parallel to the ground when the implement is in a soil working position, and which may be raised to a transport position so that it is laterally balanced or symmetrically disposed on the tractor.

It is a more specific object of the invention to provide a mounting mechanism in which the vertical position of an implement on a tractor may be varied without affecting the parallel position of the implement relative to the ground by mechanism automatically maintaining the sum of the distances between laterally spaced portions of the lift structure and of the draft structure at some constant, predetermined value.

The foregoing and other objects and advantages are attained by the present invention, various novel features of which will be apparent from the following description and from the accompanying drawings disclosing a preferred embodiment of the invention.

In the drawings:

Fig. 1 is a top view of a tractor and a mounted implement incorporating an embodiment of the invention.

Fig. 2 is a side view of the tractor implement arrangement shown in Fig. 1 with parts of the tractor broken away and with certain components of the hydraulic system being indicated somewhat diagrammatically.

Fig. 3 is an enlarged side view of a rear portion of the tractor and the implement shown in Fig. 2 with parts broken away and removed for purposes of disclosure.

Fig. 4 is a fragmentary sectional view taken generally along the lines 4—4 in Fig. 3.

Figure 5:
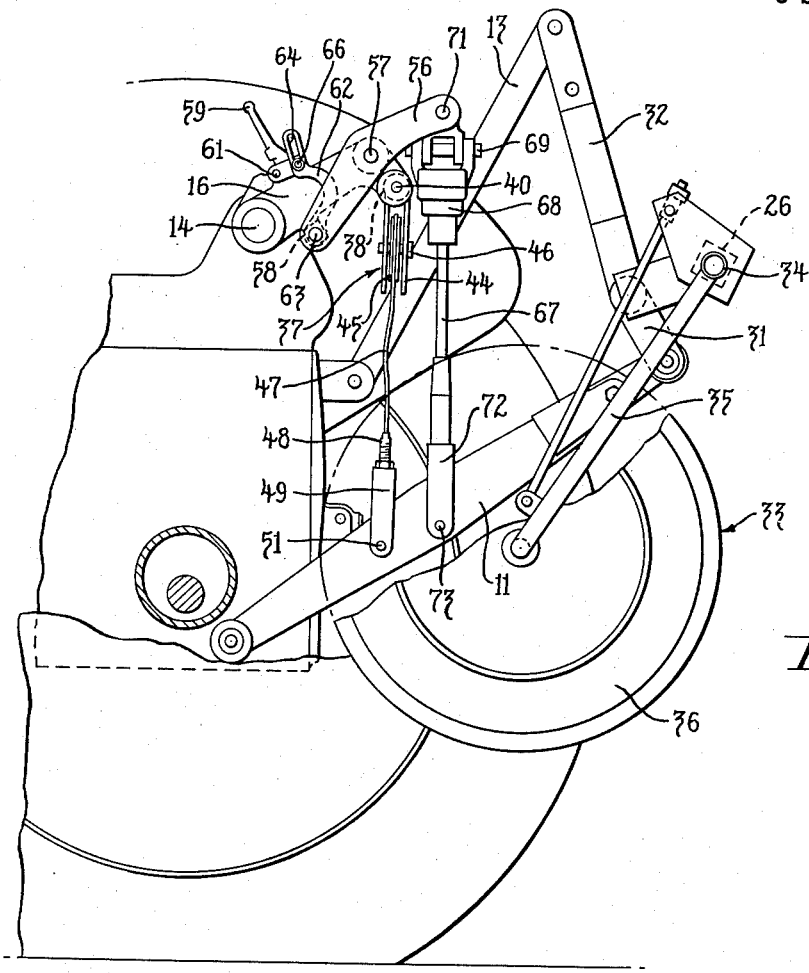
Fig. 5 is a view generally similar to Fig. 3 but showing disposition of various parts when the implement has been moved to a transport position on the tractor.

Referring to the drawings, the invention is illustrated as embodied in a mounting mechanism connecting an implement 6 to the rear portion of a tractor 7.

Although the invention has utility with almost any type of tractor adapted to mount implements, the present invention is illustrated in connection with a conventional tractor including a hitch linkage and implement control system which is well-known and is fully disclosed in Ferguson Patent No. 2,118,180. The hitch linkage includes a pair of laterally spaced draft links 11 and 12 and an upper or compression link 13 pivoted for universal movement on a rear portion of the tractor to form a three-point hitch for receiving a variety of implements. implements supported on the hitch linkage may be moved vertically on the rear portion of the tractor 7 by means of a lift structure which will be described more fully hereinafter, but which for the present may be considered as including a lift shaft 14 and an aligned pair of raidally extending lift arms 16 and 17.

Power for swinging the lift arms 16 and 17 is supplied by a power control system including a one-way cylinder 18 having its piston rod 19 reacting against a rock lever 21 extending rigidly from the lift shaft 14. Upon admission of fluid to the cylinder 18 the rod 19 extends and swings the lift arms 16 and 17 upwardly in an implement raising direction and when fluid is permitted to escape from the cylinder the arms swing downwardly. The flow of fluid to and from the hydraulic cylinder 18 is controlled by a valve mechanism (not shown) which may be actuated either manually or automatically in response to movement of the upper link 13. Such automatic control is caused by changes in reaction of the implement 6 with the soil upon a change in draft requirements which, in turn, causes movement of the upper link 13. This type of automatic control is now well known in the art and is commonly referred to as "draft control."

The implement 6 used to illustrate an embodiment of the invention is a multiple row bedder-planter which has a width substantially greater than the width of the tractor 7. The implement includes an elongated frame member or tool bar 26 which extends transversely to the direction of implement travel and acts as a support for various components such as the soil working tools or bedder bottoms 27 and also seed and fertilizer containers 28. The frame member 26 is provided with a pair of laterally spaced brackets 31 adapted to receive the rear ends of the draft links 11 and 12, and with a strut assembly 32 for receiving the rear end of the top link 13. With the draft links 11 and 12 connected to the brackets 31, respectively, and with the top link 13 connected to the strut assembly 32, the implement is mounted on the tractor so that it may be propelled thereby through the draft structure formed by the links 11 and 12.

The implement is provided with a gauging structure 33 in the form of a shaft 34 rotatably mounted on the implement frame and having a pair of radially extending arms 35 rigidly connected to opposite ends of the shaft. A pair of gauge wheels 36 are rotatably mounted on the pair of arms 35, respectively, so that they may swing vertically as a unit relative to the implement. During operation, the implement is supported on the tractor through the hitch links 11, 12 and 13 and the gauge wheels 36 are free to rise and fall in unison relative to the remainder of the implement to follow the contour of the ground. The wheels 36 are maintained in simultaneous contact with the ground and the shaft 34 is consequently maintained parallel to the surface of the ground. From this it will be noted that although the gauging structure may swing freely relative to the implement frame 26, any change in the disposition of the shaft 34 will correspondingly change position of the frame 26 to maintain it parallel to the shaft and, consequently, parallel to the ground. This makes it possible to support the entire implement weight on the tractor and still have the implement follow the contour of the ground independently of the position of the tractor.

Although a somewhat specific type of implement and gauging mechanism has been disclosed, it will be appreciated from the disclosure to follow that the invention would also have utility with other types of implements and with other types of gauging means.

Referring to Figs. 3 and 4, the mounting mechanism by which the implement 6 may be permitted to tilt and to be moved vertically in its tilted position relative to the tractor 7 includes not only a draft structure formed by the draft links 11 and 12 but also a lift structure incorporating an equalizing assembly 37. As shown in Fig. 4, the equalizing assembly includes a tubular support member 38 having a stub shaft 39 fixed to one end and received in an opening 40 in the end of the lift arm 16. The other end of the member 38 slidably receives a stub shaft 41 which is provided with a radially extending pin 42 received in a slot 43 formed in the member 38. The shaft 41 may be biased outwardly from the hollow membere 38 by means of a compression spring (not shown) so that the exposed end of the shaft 41 can be received by an opening 40 in the end of arm 17. The openings 40 afford means for journalling the shafts 39 and 41 so that the transversely extending member 38 is free to pivot relative to the lift arms 16, 17. The member 38 may be readily detached from the lift arms by moving pin 42 to the left end of slot 43 so that the shaft 41 will retract from the opening 40 in lift arm 17. This makes it possible to remove shaft 39 from the opening 40 in the other lift arm 16 and to remove the membere 38 from the tractor.

A pair of laterally spaced brackets 44 are rigidly secured at opposite ends of the tubular member 38. A pair of roller parts or pulleys 45 are rotatably mounted on the brackets by means of parallel pins 46 which extend generally longitudinally of the tractor and form axles upon which the pulleys 45 rotate. An elongated flexible member such as a cable 47 has its intermediate portion passing over both of the pulleys 45 which form parts movably engaging the cable. Opposite ends of the cable are connected to the draft links 11 and 12, respectively. Each end of the cable 47 is provided with a threaded element 48 which receives a clevis element 49. Each clevis element is pivotally connected to its associated draft link by means of a pin 51.

Figure 6:
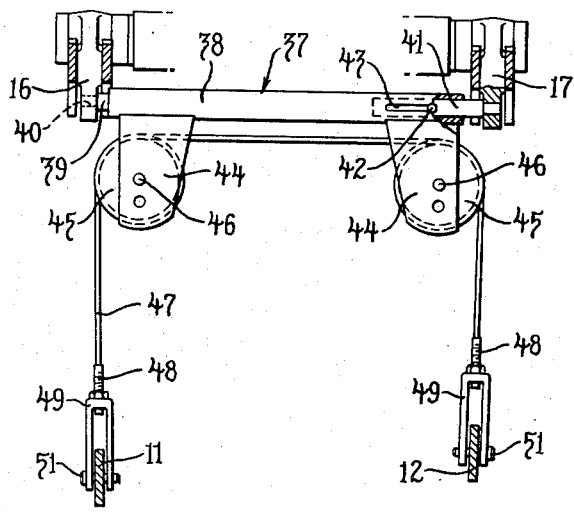
Fig. 6 is a view similar to Fig. 4 but showing a different operating condition of certain of the components.

The cable 47 forms a load transmitting means between the lift arms 16 and 17 and the draft links 11 and 12, which is movably engaged by roller parts or pulleys 45 so that the power actuated movement of the lift arms is effective to swing the draft links 11 and 12 vertically relative to the tractor. The cable 47 and pulleys 45 also makes it possible for the draft links 11 and 12 to swing equal distances in opposite directions relative to each other without destroying the load transmitting connection with the lift arms 16 and 17. For example, as seen in Fig. 6, downward swinging movement of the left draft link 11 will pull the right draft link upwardly a like amount and the cable 47 will remain taut so that any vertical movement of the lift arms 16 and 17 will be effective to move the draft links 11 and 12 simultaneously in a vertical direction, without substantial change in their positions relative to each other. Furthermore, during vertical movement of the draft links under the action of the lift arms 16 and 17, the draft links 11 and 12 may continue to move in opposite and equal directions relative to each other and the cable 47 will maintain a load transmitting connection with the lift arms in which the sum of the distances between corresponding parts of the pairs of parts formed by pins 51 and rollers or pulleys 45 remains constant. In other words, the distance between pin 51 and pulley 45 at one side of the tractor may be different than the distance between the pin 51 and pulley 45 at the other side of the tractor but the sum of the distances will remain constant. From this it will be seen that an implement 6 connected to the draft structure formed by the draft links 11 and 12 is free to tilt laterally relative to the tractor and that even though it is tilted it remains connected to the lift arms 16 and 17 for vertical adjustment in its tilted position.

Besides the equalizing assembly 37, the lift structure includes an auxiliary lift mechanism which, as seen in Fig. 3, includes a pair of auxiliary lift members 56 associated with the lift arms 16 and 17, respectively. Only the portion of the auxiliary lift mechanism associated with the lift arm 16 at the near side of the tractor in Fig. 3 will be described but it is to be understood that similar parts are disposed on the far side of the tractor. Referring now to Fig. 3, the auxiliary arm member 56 has its intermediate portion pivotally connected by a pin 57 to the rearward end of lift arm 16. The forward end of the auxiliary arm 56 is provided with a block 58 which engages a bottom portion of the lift arm 16 to limit swinging movement of the arm member 56 in a clockwise direction. Upon counterclockwise rotation of the lift shaft 14 the block 58 provides a one-way lift connection between the lift arm 16 and the arm member 56 so that they swing together as a unit in an implement raising direction. The auxiliary lift arrangement is also provided with a lock mechanism which makes it possible to retain the block 58 in continual engagement with the lift arm 16. The lock mechanism includes a lever 59 pivoted by a pin 61 to the lift arm 16, and a link 62 having one of its ends pivotally connected by a pin 63 to the arm member 56 and its other end provided with a slot 64 slidably receiving a pin 66 mounted on the lever 59. Upon counterclockwise movement of the lever 59, the pin 66 engages the upper end of the slot 64 and pulls link 62 and the forward end of arm member 56 upwardly until block engages the lift arm 16. The lift arms 16 and 56 are maintained in this position by the aligned position of pins 63, 61 and 66. However, in the normal operating condition of the implement, the lever 59 will be disposed in the position shown in Fig. 3, and the arm member 56 would be free to swing relative to the lift arm 16 between the limits afforded by the block 58 in engagement with arm 16 and by pin 66 in engagement with the upper end of slot 64.

The rearward or free end of the arm member 56 is connected to its associated draft link by a lift link 67. The upper end of the lift link is provided with a coupler 68 which affords lateral swinging movement about a pin 69 and is pivotally connected to the free end of the arm member 56 by a pin 71. The lower end of the lift link is provided with a clevis 72 pivotally connected to draft link 11 by means of a pin 73. Upon upward swinging movement lift arm 16 will eventually engage block 58 and swing arm member 56 and lift link 67 upwardly so that the draft link 11 will also swing upwardly. As pointed out above, the auxiliary lift arrangement including the auxiliary arm member 56 and the lift link 67 is duplicated at the opposite side of the tractor and is disposed between the lift arm 17 and the draft link 12.

Thus far it will be apparent that the mounting mechanism by which the implement 6 may be connected to the tractor 7 includes a draft structure formed by draft links 11 and 12 and a lift structure including an equalizing mechanism 37 permitting lateral tilting of the implement relative to the tractor and, at the same time, maintaining a load or lift transmitting connection between the lift arms 16 and 17 and the draft structure. The lift structure also includes auxiliary lift mechanism by which the lift arms 16 and 17 are connected to the draft links 11 and 12 through a one-way lift connection formed by block 58.

When the implement 6 is in a ground working position and is laterally balanced relative to the tractor, initial swinging movement of the lift arms 16 and 17 will be effective to lift the draft links 11 and 12 and, consequently, the implement 6 through the equalizing structure 37 formed in part by the pulleys 45 and cable 47. Such lifting movement will continue until the blocks 58 on the arm members 56 engage the bottom portions of the lift arms 16 and 17 to complete the one-way lift connections between the respective lift arms and arm members so that the entire structure swings as a unit. Thereafter, upward swinging movement of the lift arms 16 and 17 will be effective through the lift links 67 to raise the draft links 11 and 12 until the implement 6 reaches its transport position on the tractor, as shown in Fig. 5.

As the implement approaches its transport position shown in Fig. 5, the weight of the implement is carried entirely by the drop links 67 and the cable 47 becomes slack so that it carries no load. As will be noted from an examination of Figs. 3 and 5, this result is achieved because the distance between pins 71 and 73 remains constant during upward movement of the implement, whereas the distance between the pivot pin 51 and the member 38 decreases because the member 38 swings on a shorter arc than the pin 71. In like manner, as the implement is lowered from a transport position toward a ground working position, the entire weight of the implement is carried by the auxiliary arms 56 and the drop link 67 but, as the implement approaches its ground working position, the implement load is supported by the equalizing unit 37 including the cable 47 and the pulleys 45. The drop link 67 then becomes ineffective to carry any load because blocks 58 associated with the pair of arm members 56, respectively, move out of engagement with the respective lift arms 16 and 17.

When the implement 6 is raised from a ground working position in which the tool bar 26 is tilted relative to the tractor, initial upward movement of the lift arms 16 and 17 will raise the implement in its tilted position through the equalizing assembly 37. Further movement of the lift arms 16 and 17 will raise the lower end of the tool bar 26 first until opposite sides are adjusted to the same height on the tractor and thereafter both sides of the bar 26 will be raised simultaneously and equally until the implement reaches a transport position in which it is laterally balanced on the tractor. During raising movement the low side of the tool bar 26 is raised first because the one-way lift connection between the lift arm and the arm member 56 associated with the low side of the implement becomes effective first. On the other hand, the lift arm and auxiliary arm associated with the other side of the implement will be free to pivot relative to each other. However, as the low side of the implement reaches a laterally balanced position on the tractor, the lift arm and auxiliary arm 56 associated with the other side of the implement becomes effective through the one-way lift connection afforded by the block 58 so that they swing together. This arrangement makes it possible for the implement to tilt relative to the tractor when the implement is in its ground working position and to be held in a laterally balanced or symmetrical position on the tractor when it is in the transport position. In such a position the distances from each of the pin parts 51 to the lift structure are maintained equal.

It will be noted that since initial lifting movement does not affect the tilted relation of the implement relative to the tractor, the arrangement is particularly adapted for use with a power operated system including draft control. With such a system the implement may be vertically adjusted automatically when it is in ground working position without interfering with the implement, which is free to follow the contour of the ground.

It will now be seen that there has been provided a mounting mechanism by which an implement may be supported on a tractor so that its entire weight may be supported thereon while it is free to tilt to follow the contour of the ground independently of the position of the tractor, and by which the implement may be adjusted vertically in a ground working position in its tilted position relative to the tractor. Furthermore, the implement may be moving vertically from a lower or ground working position in which the implement may be laterally tilted relative to the tractor to an upper or transport position in which it is laterally balanced relative to the tractor. In addition, the mechanism permitting tilting of the implement when it is in its ground working position is relatively simple and includes load transmitting means such as cable 47 disposed between the lift structure including lift arms 16 and 17 and the laterally tiltable and vertically swingable draft structure formed by the draft links 11 and 12, the mechanism is so arranged that upon vertical adjustment of the lift structure the sum of the distances between laterally spaced portions on the draft structure and correspondingly laterally spaced portions on the lift structure remain at a constant predetermined value.

It should be understood that it is not intended to limit the invention to the above described forms and details, and that the invention includes such other forms and modifications as are embraced by the scope of the appended claims.

I claim as my invention:

1. In a mounting mechanism for coupling an agricultural implement to a tractor comprising, in combination, a pair of laterally spaced draft links extending rearwardly and being independently pivoted on said tractor, a power operated lift arm structure movable vertically on said tractor above said draft links, a one-way link connection between each of said draft links and said lift arm structure for coupling said links to said structure when the latter moves upwardly past a selected point so as to uniformly raise the links thereafter, and a flexible member extending between said draft links and having its intermediate portion movably received by said lift arm structure, said flexible member being of sufficient length to maintain a direct, vertical-load bearing connection between each of said draft links and said lift arm structure when the latter is below said selected point so that the arms are supported by the flexible member while swinging oppositely up and down.

2. An arrangement for mounting a wide agricultural implement on a tractor comprising, in combination, a draft structure extending transversely of said tractor and carrying said implement so that the implement extends laterally of the tractor, said draft structure being mounted on said tractor for both up and down free swinging movement and transverse tilting movement relative to the tractor, a lift structure pivoted on said tractor, load transmitting means coupling said lift structure and a pair of laterally spaced points on said draft structure so that the weight of the implement is transferred to said lift structure thus suspending the implement in operating relation to the ground, ground engaging means on said implement for laterally tilting the implement and said draft structure so that the suspended implement conforms to the ground contour transverse of the tractor, said load transmitting means being effective to maintain constant the sum of the distances between said lift structure and said points as the suspended implement tilts in response to changing ground contours.

3. An arrangement for mounting a wide agricultural implement on a tractor comprising, in combination, a draft structure extending transversely of the tractor and carrying said implement so that the implement extends laterally of the tractor, said draft structure being mounted on said tractor for both up and down free swinging movement and transverse tilting movement relative to the tractor, a lift structure pivoted on said tractor, load transmitting means coupling said lift structure and said draft structure so that the weight of the implement is transferred to said lift structure thus suspending the implement in operating relation to the ground, ground engaging means on said implement for laterally tilting the implement and said draft structure so that the suspended implement conforms to the ground contour transverse of the tractor, said load transmitting means including a flexible member whose middle portion movably engages one of said structures and whose opposite ends are coupled to laterally spaced points on the other of said structures so as to maintain suspension of the draft structure and the implement as the latter tilts in response to changing ground contours.

4. An arrangement for mounting a wide agricultural implement on a tractor comprising, in combination, a pair of draft links spaced transversely of said tractor and carrying said implement so that the implement extends laterally of the tractor, said draft links being independently pivoted on said tractor for up and down free swinging movement, a pair of lift arms pivoted on said tractor above said draft links, each of said lift arms carrying a pulley, a flexible member having its intermediate portion received by said pulley and its opposite ends coupled to respective ones of said draft links so that the weight of said draft links and the implement is transferred to said lift arms thus suspending the implement in operating relation to the ground, and ground engaging means on said implement for laterally tilting the implement so that the suspended implement conforms to the ground contour transverse of the tractor, said flexible member being effective to maintain suspension of the draft links and implement by riding about said pulleys as the suspended implement tilts in response to changing ground contours.

References Cited in the file of this patent

UNITED STATES PATENTS

| Re. 23,098 | Rogers et al. | Apr. 12, 1949 |
| 1,391,101 | Doe | Sept. 20, 1921 |
| 1,401,029 | Armantrout | Dec. 20, 1921 |
| 2,140,144 | Silver | Dec. 13, 1938 |
| 2,363,292 | Brown | Nov. 21, 1944 |
| 2,624,256 | Todd | Jan. 6, 1953 |
| 2,737,735 | Westfall | Mar. 13, 1956 |